United States Patent

Davies et al.

[15] 3,691,303

[45] Sept. 12, 1972

[54] CIRCUIT USAGE ANALYZER

[72] Inventors: Dennis Davies, Tucker; John P. Kern, Atlanta, both of Ga.

[73] Assignee: Digital Telephone Systems, Inc., San Rafael, Calif.

[22] Filed: Jan. 19, 1970

[21] Appl. No.: 3,624

[52] U.S. Cl. .................................................. 179/8 A

[51] Int. Cl. .......................................... H04m 15/32

[58] Field of Search ........................ 179/8 A, 9, 7.1 R

[56] References Cited

UNITED STATES PATENTS

| | | | |
|---|---|---|---|
| 2,194,072 | 3/1940 | Humphries | 179/8 A |
| 2,421,943 | 6/1947 | Hill | 179/8 A |
| 3,324,241 | 6/1967 | Bachelet | 179/8 A |

*Primary Examiner*—William C. Cooper
*Assistant Examiner*—Thomas D'Amico
*Attorney*—Patrick F. Henry

[57] ABSTRACT

A telephone traffic usage analyzer and recorder providing a method of simultaneously reading all of a number of telephone circuits at one time so as to collect telephone traffic data from a plurality of such telephone circuits, known as sleeves, arranged in a trunk group. Each sleeve circuit has a resistor. A cumulative condenser is charged through the resistance in each sleeve, and the condenser is then discharged at a given voltage which provides an output signal to indicate one CCS unit which is the standard measure of telephone traffic data. In effect, this is a variable pulsing device with the rate of pulse being governed by the number of sleeve leads that are busy. By using the appropriate resistors and capacitors each pulse indicates one CCS.

10 Claims, 1 Drawing Figure

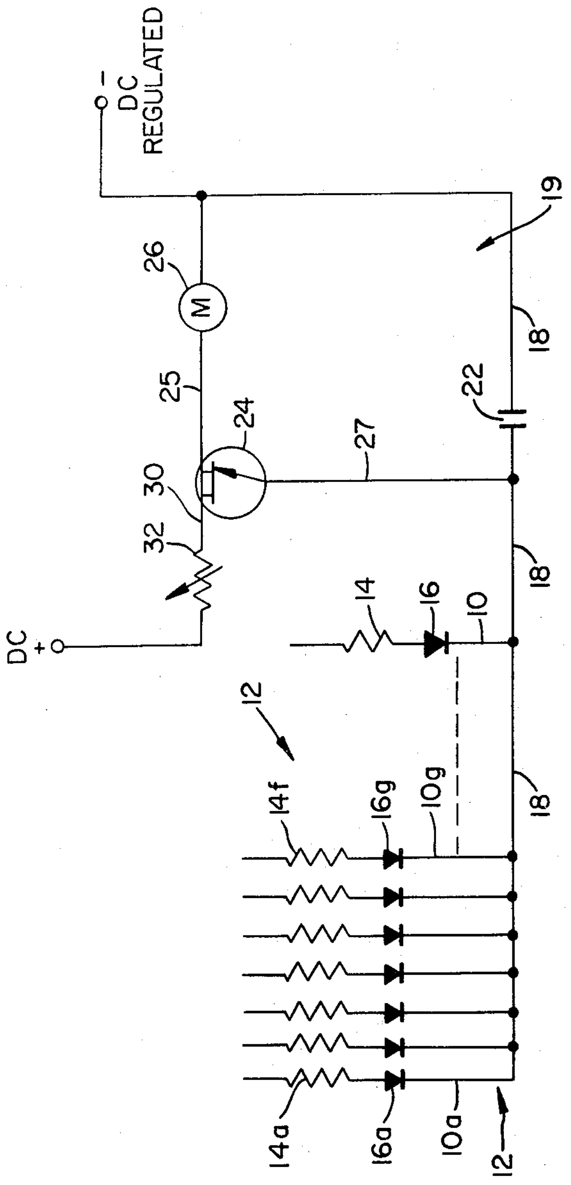
DC REGULATED
-
DC
+
M
10
10a
10g
12
14
14a
14f
16
16a
16g
18
19
22
24
25
26
27
30
32

CIRCUIT USAGE ANALYZER

BACKGROUND OF THE DISCLOSURE

1. Field of the Disclosure

Circuit analyzers especially communication circuits such as telephone sleeve and trunk circuits and data taking and analyzing means and devices.

2. Description of the Prior Art

The prior art method of collecting telephone traffic data consist of a scanning device which scans over the sleeves and the trunk group being studied and when a ground is present on a sleeve in the group (indicating a busy trunk) a signal is put out for the count of 1. A CCS unit (or c.c.s. unit) is a hundred call seconds for example one trunk busy 100 seconds. If the scanning rate is one sleeve per second and 100 sleeves are being scanned then each sleeve is examined once every 100 seconds. Every sleeve which has a ground on it when it is scanned, signals one CCS to a Peg count meter.

SUMMARY OF THE INVENTION

By placing a resistor to each sleeve circuit and charging a condensor through this resistance and then discharging the condensor a voltage is produced to put out a signal to indicate one CCS unit and a more representative indication is obtained than the previous method of scanning one sleeve per second which presumes that a trunk is busy for a hundred seconds after making a 1 second test. The present method of collecting the telephone traffic data consist of a scanning device which scans over the sleeves in a trunk group being studied and when a ground is present on any sleeve in the group, which indicates a busy signal, the signal is put out for the count of 1. According to the present arrangement all of the sleeves are in effect "looked at" by placing the resistance to each sleeve and then charging a condenser through this resistance and then discharging the condenser at given voltage to put out a signal to indicate one CCS unit. This in effect gives a variable pulsing device with the rate of pulse being governed by the number of sleeves busy and is a better way of checking the circuits as well as a more representative way. Thus all sleeves are monitored 100 percent of the time and there is no limit to the number of sleeves which can be monitored in a group. In one form a transistor is fired to discharge the condensor through a meter.

BRIEF REFERENCE TO THE DRAWINGS

The FIGURE is schematic circuit diagram of a typical circuit for performing the present method.

DESCRIPTION OF THE PREFERRED EMBODIMENT

In the FIGURE there is shown a plurality of individual communication circuits known as sleeves designated by reference numerals 10A, 10B, 10C, etc. Each sleeve is in a trunk group represented by the reference numberial 12. Each sleeve 10A, 10B, etc., is provided with a respective resistor 14 which may be a megohm resistor (1 percent) and in series therewith a diode 16A, 16B, etc., respectively, which can be of any type such as a IN 34, IN 295, IN 62, etc. This arrangement isolates the sleeves, 10A, 10B, etc., from each other but combines them into one lead 18 for measuring the usage of the equipment in the trunk, Group 12.

The portion of the circuit just described and comprising respective sleeves 10A, 10B, 10C, etc. and respective resistors 14A, 14B, 14C, etc., and respective diode 16A, 16B, 16C, etc., is known as the sleeve treatment unit. A ground occurs on each individual sleeve 10A, 10B, 10C, etc., when a circuit is in use. The other portion 19 of the device is known as the data summation unit and comprises a condensor 22 which may be a 100 mf condensor that is charged through the sleeve treatment unit from the common lead 18. The rate of charge will depend upon the number of sleeves 10A, 10B, etc., in use. A unijunction transistor 24 is connected in a circuit 25 to the lead 18 and fires by preselected regulation discharging the condenser 22 through the meter 26. Meter 26 preferably is a "-Sodeco" peg count meter of the accumulative type. Resistance of the meter 26 winding (not shown) may be in the order of 130 ohms. The unijunction transistor 24 may be anyone of many different types such as 2N491, 2N492, 2N4870 or 2N4871. In circuit with a meter 26 is the unijunction transistor 24 and in a circuit 30 is a 6K potentiometer 32 which varies the firing voltage of the transistor 24 thereby giving a fine adjustment on charging time of the condenser 22. The timing may be adjusted so that a (one) sleeve busy for 100 seconds will fire the unijunction transistor 24 one time thereby giving one unit on the meter of 100 call seconds, etc. Ten sleeves busy for 10 seconds will fire the unijunction transistor 24 one time still giving a unit on the meter of 100 call seconds, etc. Thus all sleeves 10A, 10B, etc. are monitored 100 percent of the time and there is no limit to the number of sleeves which can be monitored as a group. Large groups would require a change of meter which is more sensitive, which is, also, available from "Sodeco." The other side of circuit 30 leads to the positive or ground side of the 48 volt DC source.

While there is shown and described a particular embodiment of the invention together with a representative schematic, and while this has been described for communications circuits and especially telephone circuits, this is by way of illustration only as the same arrangement has other applications and there are various changes, ommissions, additions, and departures which may be made in the invention still within the scope of the interpretation of the appended claims.

What is claimed:

1. A method for analyzing traffic on a plurality of individual circuits such as telephone trunk sleeve circuits comprising continuously monitoring all of the individual circuits to be analyzed while isolating each individual circuit from the others, continuously storing potentials whose rate of charge is instantaneously proportional to the total number of individual circuits in use at any given instant, successively triggering discharge of the stored potentials upon each attainment of a preset threshold level, and measuring the number of triggered discharges of the stored potentials as an indication of the traffic being borne by the circuits.

2. The method of claim 1 wherein the circuit is calibrated to provide one discharge of the stored potential for a CCS unit.

3. The method of claim 2 wherein the stored potential is stored in a common condenser coupled to all of the circuits being analyzed through respective isolating diodes and load resistors and the triggered discharge is attained by coupling the common condenser to control the discharge of a threshold operated controlled conductivity discharge device connected to operate a measuring instrument.

4. The method of claim 3 wherein the threshold operated controlled conductivity discharge device is a unijunction transistor and the measuring instrument is a mechanical peg count meter of the accumulative type.

5. An analyzing device for examining the usage of a plurality of individual circuits such as individual telephone trunk sleeve circuits comprising input means for continuously monitoring all of the individual circuits to be analyzed for use, means for isolating each individual circuit from the others, common condenser means, means connecting all of the isolated circuits in common to the common condenser means for continuously storing potentials whose instantaneous rate of charge at any given instant is proportional to the total number of individual circuits in use, a threshold operated controlled conductivity discharge device connected across the common condenser means for successively discharging the condenser means upon the stored potential attaining a preset threshold value, and measurement means connected in circuit relationship with the threshold operated discharge device for measuring the number of triggered discharges of the common condenser means as an indication of the usage of the individual trunk circuits.

6. An analyzing device according to claim 5 further including means coupled to the analyzing device for adjusting the threshold level at which the threshold operated controlled conductivity discharge device is triggered.

7. An analyzing device according to claim 5 wherein the threshold operated controlled conductivity discharge device is a unijunction transistor.

8. An analyzing device according to claim 5 wherein the measurement means comprises mechanical peg count meter of the accumulative type.

9. An analyzing device according to claim 5 wherein the input means for continuously monitoring comprises individual load resistors connected in the respective circuits to be analyzed and the isolating means for each individual circuit comprises an isolating diode connected between the respective load resistor and a common terminal conductor means connecting all of the circuits in common to the common condenser means.

10. An analyzing device according to claim 5 further including means coupled to the analyzing device for adjusting the threshold level at which the threshold operated controlled conductivity discharge device is triggered, and wherein the input means for continuously monitoring comprises individual load resistors connected in the respective circuits to be analyzed and the isolating means for each individual circuit comprises an isolating diode connected between the respective load resistor and a common terminal conductor means connecting all of the circuits in common to the common condenser means, the threshold operated controlled conductivity discharge device is a unijunction transistor, and the measurement means comprises a mechanical peg count meter of the accumulative type.

* * * * *